Figure 9:
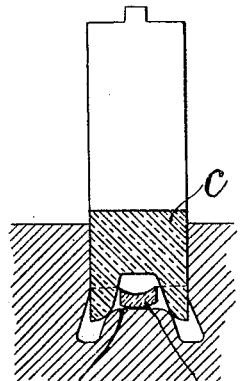

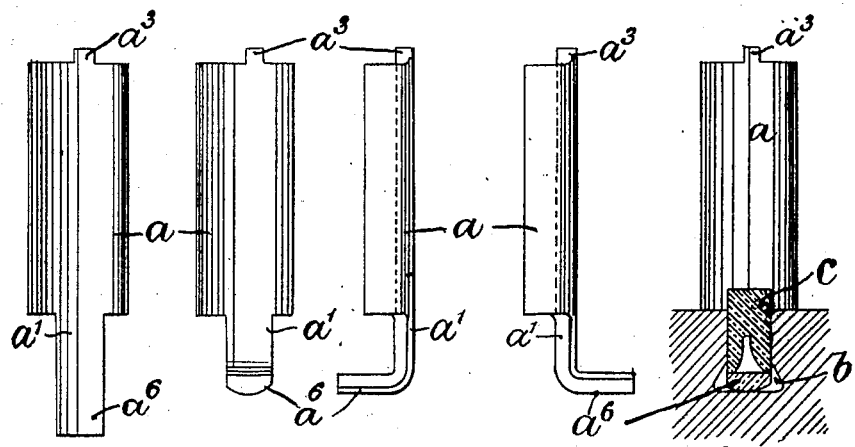
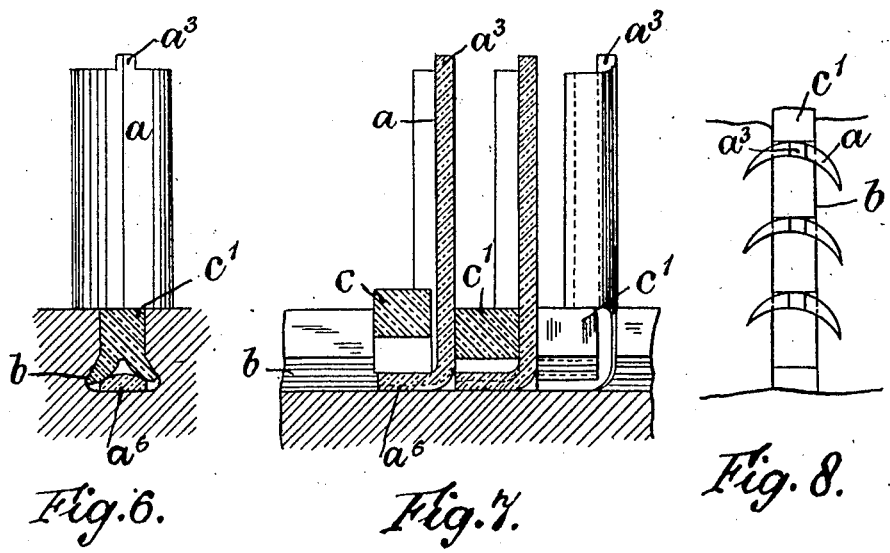

No. 882,521. PATENTED MAR. 17, 1908.
A. JUDE.
TURBINE.
APPLICATION FILED JULY 20, 1907.
4 SHEETS—SHEET 2.

WITNESSES
INVENTOR
Alexander Jude
By Nno Nallaw White
ATT'Y.

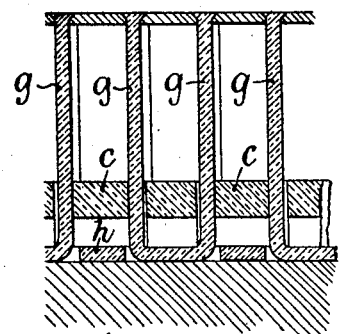
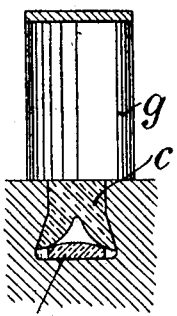
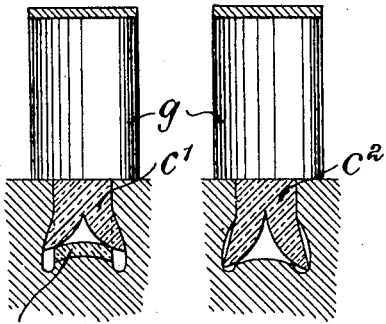
Fig.19.  Fig.20.  Fig.21.  Fig.22.
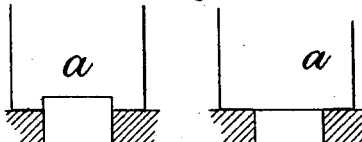
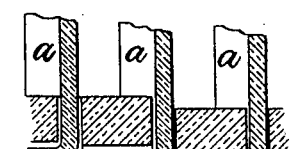
Fig.23.  Fig.24.  Fig.25.  Fig.26.
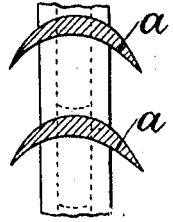
Fig.30.

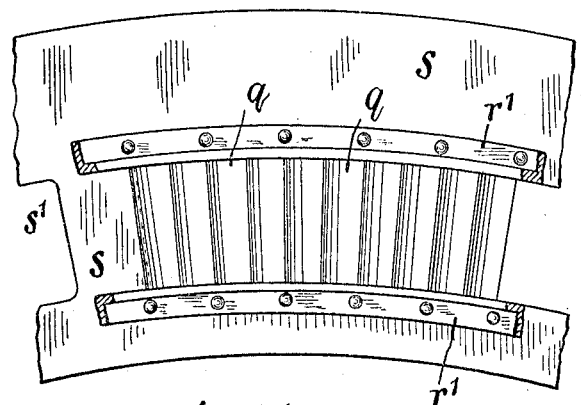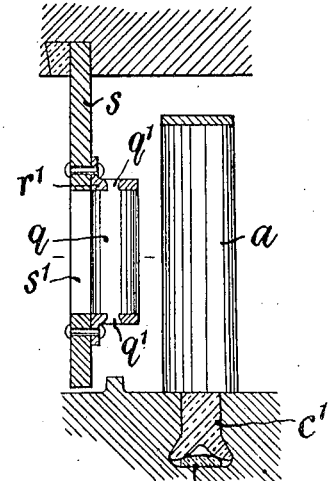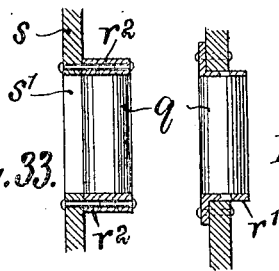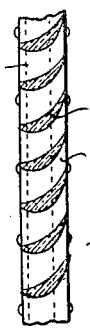

UNITED STATES PATENT OFFICE.

ALEXANDER JUDE, OF BIRMINGHAM, ENGLAND, ASSIGNOR TO BELLISS & MORCOM LIMITED, OF BIRMINGHAM, ENGLAND.

TURBINE.

No. 882,521.  Specification of Letters Patent.  Patented March 17, 1908.

Original application filed October 13, 1906, Serial No. 337,253. Divided and this application filed July 20, 1907. Serial No. 384,739.

*To all whom it may concern:*

Be it known that I, ALEXANDER JUDE, a subject of the King of Great Britain, residing at Ledsam Street Works, Birmingham, county of Warwick, England, have invented certain new and useful Improvements in Turbines, of which the following is a specification.

This case is a division of application Serial Number 332351.

This invention relates to improvements in the construction of guide-blades and vanes and to means for assembling them in and securing them to the stators and rotors respectively of turbine motors.

According to one form of construction securing blocks are formed with one or more deformable fangs, preferably in pairs, constituting a bifurcation, which, in the assembly of the parts, are distorted by being forced into the under cut portions of a ring-groove turned in the internal surface of the stator or the external surfaces of the rotor respectively, the space within the ring-groove being thereby completely filled and the guide blades or vanes secured therein by a clenching operation.

Various modifications of detail may be adopted for effecting the secure attachment by the clenching operation above described, as for example, the guide-blade or vane may be formed with a foot which lies lengthwise within the ring-groove whereby the bifurcated intermediate block, which is subsequently clenched into the groove outside the foot, firmly secures the latter. Twin guide-blades or vanes may be employed their shanks being connected by a portion which extends lengthwise within the groove serving for securing purposes, the function of the above mentioned foot. As a further alternative, two methods of fastening may be combined, there being fangs and also a foot formed on each of the guide-blades and vanes.

In respect to further modifications of detail, the section of the groove may be adapted to effect the spreading of the fangs by means of a central ridge at the bottom of the groove or, alternatively, the spreader may be a longitudinal rod which is inserted in the groove preparatory to assembling and clenching.

A further portion of the invention is adapted to facilitate the provision of the fixed guide-blades, these being formed in sets which are mounted in elongated apertures provided in diaphragm plates which are secured to the stator.

Figure 10:
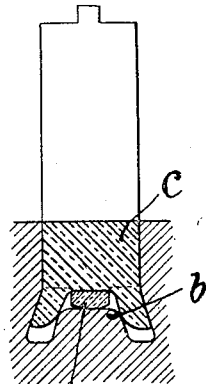
Figure 11:
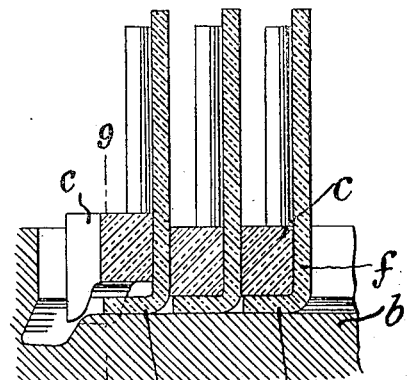
Figure 12:
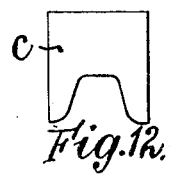
Figure 13:
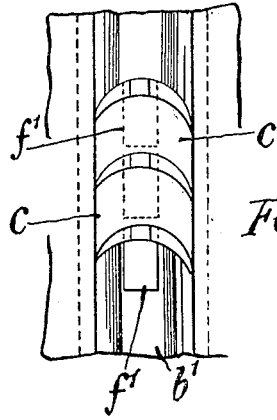
Figure 14:
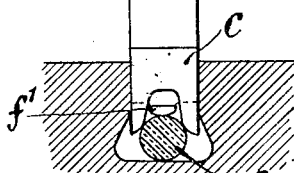
Figure 15:
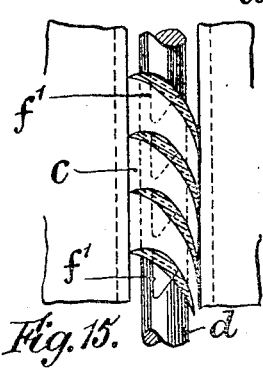
Figures 16, 18:
Figure 17:
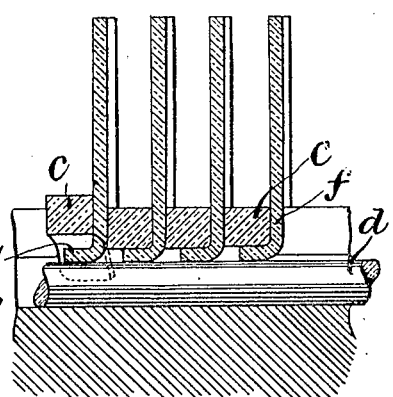
Figure 27:
Figure 28:
Figure 29:

The invention is illustrated in the accompanying drawings in which:

Figure 1 is a rear view of the blade before its shank has been bent. Fig. 2 is a like view showing the shank bent. Fig. 3 is a side view of Fig. 2. Fig. 4 is a view similar to Fig. 3 but showing the shank bent in the opposite direction. Fig. 5 is a sectional view with the vane in the carrying element and the block ready to be driven home. Fig. 6 is a like view with the block driven home. Fig. 7 is a side view partly in section showing the blocks in the positions shown in Figs. 5 and 6. Fig. 8 is a plan of the assembled parts. Figs. 9 and 10 are sections of a modification on the line 9—9 showing the block in different positions. Fig. 11 is a longitudinal section showing the blocks in the positions shown in Figs. 9 and 10. Fig. 12 is a detail view of the block. Fig. 13 is a plan of the assembled parts. Figs. 14 to 18 show a further modification of which Fig. 14 is a sectional view; Fig. 15 a plan partly in section of the assembled parts; Fig. 16 is a detail; Fig. 17 a longitudinal section and Fig. 18 a detail. Figs. 19 to 22 show further modifications of which Fig. 19 is a longitudinal section and Figs. 20, 21 and 22 are transverse sections of details slightly differing from each other. Figs. 23 to 30 show still further modifications of which Figs. 23, 24 and 25 are sectional views showing the parts in different positions. Fig. 26 is a longitudinal section showing the parts in the positions shown in Figs. 23, 24 and 25; Fig. 27 is an elevation of the block and Figs. 28 and 29 are alternative plans and Fig. 30 is a plan of the parts assembled. Figs. 31 to 36 show the further portion of the invention of which Fig. 31 is a side view; Fig. 32 is a transverse section. Fig. 33 is a transverse section and Fig. 34 a sectional plan through the vanes of a modification; and Figs. 35 and 36 are like views of a still further modification.

Referring to the first portion of the invention, a strip of metal of section suitable to form a guide-blade or vane *a* is stamped or machined to a shape such as is indicated, the breadth of the portion $a^1$, which forms the shank of the vane, being lessened by the removal of the thin edges. At the other end of the piece $a$, a lug $a^3$ is formed for the purpose of making a riveted attachment to the shrouding, in the usual way.

Various constructions will be described in which the guide blade or vane is formed with a tangentially extending foot the clenching being effected by interposed bifurcated blocks. Referring to Figs. 1–8, Fig. 1 shows the form which results from stamping or machining the strip there being a lug $a^3$ for securing the shrouding as before mentioned and a long shank $a^6$ which is bent as shown in Figs. 2, 3 or as in Fig. 4. The clenching securing block $c$, Fig. 5 is bifurcated. The foot $a^6$ serves to spread the fangs as the block $c$ is forced from the position and form $c$ Figs. 5, 7 to those shown by $c^1$ Figs. 6, 7. Fig. 8 is a plan view of the assembled parts.

Figs. 9–13 show a form of construction in which a portion $f^1$ of the shank $f$ of a guide-blade or vane is narrowed and bent at right angles to form a foot, the remainder of the shank being kept at the full width of the groove. Fig. 9 is a transverse section along the line 9—9 of Fig. 11 showing the parts assembled preparatory to being forced into the groove. Fig. 10 shows the same parts after the clenching operation has been performed. Fig. 11 is a longitudinal section, one of the securing blocks being shown projecting from the groove. Fig. 12 is a separated view of the securing block and Fig. 13 is a plan.

Figs. 14–18 are corresponding views of a form of construction which differs from the last described in respect to the unsymmetrical form of the vanes and as to the employment of a rod $d$ in the groove in place of the ridge $b^1$ of Figs. 9–13. The securing block $c$ is shown in plan in Fig. 18 before the splaying operation has been performed.

Figs. 19, 20 and 21 show how the bifurcated retaining block $c$ before mentioned may be employed to secure twin-vanes $g\,g$ which are constructed in a manner described in my former specification Serial Number 332,351. A bifurcated block of the same shape may also be employed as a distance-piece inserted in the space in the groove which separates one pair of twin-vanes from the next. In order that those distance-pieces may in dimension as well as shape be like the securing block which is inserted between the two twin elements, a short portion $h$ of a strip is first inserted in the groove to serve the purpose of spreading and supporting the fangs of the bifurcated block. Alternatively if the bottom of the groove is made slightly rounded to initiate the spreading of the fangs when the distance piece is forced home, bifurcated block $c^2$ of greater depth can be used, as shown in Fig. 22, as a distance piece, alternatively with a retaining piece $c^1$ as shown in Fig. 21.

Figs. 23–30 show a guide-blade or vane furnished with a bifurcation for self clenching and also a tangentially directed foot whereby the hold fast can be fortified by a clenching block as before described. The double means of attachment will render a less depth of groove sufficient for the purpose. Of the last mentioned figures Fig. 23 shows the guide-blade or vane and block inserted in the groove preparatory to clenching. Fig. 24 shows the blade or vane clenched. Fig. 25 shows the block also clenched. Each of these stages in the process of assembly are also shown in Fig. 26. Fig. 27 is an elevation of the clenching block and Figs. 28 and 29 are alternative plans and Fig. 30 is a plan of the parts assembled. In these figures two ridges are formed in the bottom of the groove between which the foot is centered thus promoting the rigidity of the attachment.

The further portion of the invention is illustrated in Figs. 31–36 and relates to a method of making and securing the fixed blades or nozzle vanes of a stator, which arrangement is applicable to turbines of which the rotors are fitted with vanes constructed as shown. According to this construction, blades $q$ are cut or stamped out of strip leaving at each end a lug $q^1$ whereby they are secured by riveting to strips $r^1$ of angle section as shown in Figs. 31 and 32, or strips $r^2$ of rectangular section as shown in Fig. 33, the strips $r^1$ or $r^2$ being secured to a plate $s$ provided with apertures $s^1$. As shown in Figs. 31–34 the strips are secured entirely on one side of the surface of the plate $s$ whereas in Figs. 35 and 36 the strips are inserted within the apertures $s^1$ of the plate.

Claims.

1. Means for securing turbine guide-blades and vanes, formed from a strip of uniform section to their carrying elements, comprising an under-cut ring-groove in the said elements respectively, and a piece having a fang which on being forced into the ring-groove, will be distorted to occupy the recess beneath the overhanging wall of the groove.

2. Means for securing turbine guide-blades and vanes, formed from a strip of uniform section, their carrying elements, comprising an under-cut ring-groove in the said elements respectively, a shank formed integrally with the guide-blade and vane respectively, having a tangentially extending foot portion, and a piece having a fang which, on being forced into the portion of the ring-groove containing the said foot will be distorted to occupy the recess beneath the overhanging wall of the groove, the head of the said piece overlying and retaining the foot.

3. Means for securing turbine guide-blades and vanes, formed from a strip of uniform section, their carrying elements, comprising an under-cut ring-groove in the said elements respectively, a bifurcated piece, and means for directing the bifurcations into the undercut portions of the groove.

4. Means for securing turbine guide-blades and vanes, formed from a strip of uniform section, their carrying elements, comprising an under-cut ring-groove in the said elements respectively, a bifurcated piece, and means for directing the bifurcations into the undercut portions of the groove which means consist of a longitudinal rod.

5. Means for securing turbine guide-blades and vanes, formed from a strip of uniform section, to their carrying elements, comprising an under-cut ring-groove in the said elements respectively, a shank formed integrally with the guide-blade and vane respectively having a tangentially extending foot portion and a bifurcated piece the bifurcations of which, on being forced into the portion of the ring-groove containing the said foot will be distorted to occupy the recesses beneath the overhanging walls of the groove, the head of said piece overlying and retaining the foot.

6. Means for securing turbine guide-blades and vanes, formed from a strip of uniform section, to their carrying elements, comprising an under-cut ring-groove in the said elements respectively, a tangentially extending foot portion of a pair of guide-blades and vanes respectively, and a bifurcated piece the bifurcations of which, on being forced into the portion of the ring-groove containing the said foot will be distorted to occupy the recesses beneath the overhanging walls of the groove, the head of said piece overlying and retaining the foot.

7. Means for securing turbine guide-blades and vanes, formed from a strip of uniform section, to their carrying elements, comprising an under-cut ring-groove in the said elements respectively, a shank formed integrally with the guide-blade and vane respectively having a tangentially extending foot portion and a fang, and a piece having a fang, which fangs on being forced into the ring-groove will be distorted to occupy the recess beneath the overhanging wall of the groove, the head of said piece overlying and retaining the foot.

8. Means for securing turbine guide-blades and vanes, formed from a strip of uniform section to their carrying elements, comprising an undercut ring-groove in the said elements respectively, a shank formed integrally with the guide blade and vane respectively, having a tangentially extending foot portion and a bifurcated portion, and a bifurcated piece, the bifurcations of both of which on being forced into the ring-groove will be distorted to occupy the recesses beneath the overhanging walls of the groove, the head of said piece overlying and retaining the foot.

9. A combination of fixed guide-blades formed from a strip of uniform section and moving vanes for a turbine motor in which the guide-blade construction and fixing comprises equally pitched blades having rivet lugs at their ends, carrier-strips having recesses therein in which the lugs of the blades are riveted, a diaphragm plate with apertures, and means for securing the said carrier-strips to the borders of the apertures in the diaphragm plate.

10. A combination of fixed guide-blades formed from a strip of uniform section and moving vanes for a turbine motor in which the guide-blade construction and fixing comprises equally pitched blades having rivet lugs at their ends, carrier-strips having recesses therein in which the lugs of the blades are riveted, a diaphragm plate with apertures, and means for securing the said carrier-strips to the borders of the apertures in the diaphragm plate the blades being situated within the apertures of the diaphragm plates.

In testimony whereof I have hereunto set my hand in the presence of two subscribing witnesses.

ALEXANDER JUDE.

Witnesses:
WALTER CLOWES,
HAROLD CORBETT.